(12) United States Patent
Likander et al.

(10) Patent No.: US 10,703,662 B2
(45) Date of Patent: Jul. 7, 2020

(54) IMPROVING SLUDGE DEWATERABILITY AND ENERGY BALANCE OF WASTEWATER TREATMENT

(71) Applicant: Kemira Oyj, Helsinki (FI)

(72) Inventors: Joonas Likander, Espoo (FI); Sakari Halttunen, Espoo (FI); Outi Grönfors, Espo (FI); Bengt Hansen, Ramlösa (SE)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 16/093,029

(22) PCT Filed: Apr. 7, 2017

(86) PCT No.: PCT/EP2017/058345
§ 371 (c)(1),
(2) Date: Oct. 11, 2018

(87) PCT Pub. No.: WO2017/178356
PCT Pub. Date: Oct. 19, 2017

(65) Prior Publication Data
US 2019/0144321 A1 May 16, 2019

(30) Foreign Application Priority Data
Apr. 11, 2016 (SE) ...................................... 1650487

(51) Int. Cl.
*C02F 11/14* (2019.01)
*C02F 1/52* (2006.01)
(Continued)

(52) U.S. Cl.
CPC ............ *C02F 11/147* (2019.01); *C02F 1/004* (2013.01); *C02F 1/5236* (2013.01); *C02F 1/56* (2013.01);
(Continued)

(58) Field of Classification Search
CPC ....... C02F 11/147; C02F 11/04; C02F 11/143; C02F 1/56; C02F 1/5236; C02F 1/004;
(Continued)

(56) References Cited

U.S. PATENT DOCUMENTS 3,397,139 A    8/1968  James et al.
5,846,433 A *  12/1998 Sorensen ................. C02F 1/56
                                                                210/709
(Continued)

FOREIGN PATENT DOCUMENTS

DE          10063888 A1 *  7/2002
EP           0625961 A1    11/1994
(Continued)

OTHER PUBLICATIONS

Machine-generated English translation of DE 10063888, generated on Jan. 22, 2020.*

(Continued)

*Primary Examiner* — Fred Prince
(74) *Attorney, Agent, or Firm* — Moser Taboada

(57) ABSTRACT

The present invention relates to a process for treating primary sludge in a wastewater treatment plant, comprising the steps of admixing an organic coagulant and/or polymer to wastewater; allowing a primary treatment of the wastewater in the presence of the organic coagulant or polymer; separating solids as a primary sludge from said primary treatment; and dewatering the primary sludge. The present invention further relates to a method of improving primary sludge dewaterability and improving energy balance of a wastewater treatment plant.

18 Claims, 4 Drawing Sheets

(51) Int. Cl.
| | |
|---|---|
| *C02F 1/56* | (2006.01) |
| *C02F 3/28* | (2006.01) |
| *C02F 1/00* | (2006.01) |
| *C02F 11/04* | (2006.01) |
| *C02F 1/38* | (2006.01) |
| *C02F 11/147* | (2019.01) |
| *C02F 11/143* | (2019.01) |

(52) U.S. Cl.
CPC ............... *C02F 3/28* (2013.01); *C02F 11/04* (2013.01); *C02F 11/143* (2019.01); *C02F 1/38* (2013.01); *C02F 2209/10* (2013.01); *C02F 2303/10* (2013.01); *Y02E 50/343* (2013.01)

(58) Field of Classification Search
CPC .... C02F 3/28; C02F 2303/10; C02F 2209/10; C02F 1/38; Y02E 50/343
USPC .......................... 210/603, 608, 613, 631, 609
See application file for complete search history.

(56) References Cited

U.S. PATENT DOCUMENTS 7,291,275 B1    11/2007    Davis et al.

2004/0099599 A1* 5/2004 Van Vliet .............. C02F 1/4672
 210/603
2006/0231499 A1 10/2006 Brummett
2008/0053916 A1* 3/2008 Taki ........................ C02F 11/14
 210/728
2011/0186510 A1* 8/2011 Whiteman ................ C02F 3/12
 210/630
2013/0213883 A1* 8/2013 Josse ...................... C02F 3/302
 210/630
2015/0076059 A1* 3/2015 Theodoulou .......... C02F 11/125
 210/608
2016/0214879 A1* 7/2016 Josse ...................... C02F 11/04
2017/0275195 A1* 9/2017 Sievers ................. C02F 11/121

FOREIGN PATENT DOCUMENTS

JP          2002316191 A      10/2002
WO       WO 93/15026 A1 *    5/1993

OTHER PUBLICATIONS

International Search Report dated Jun. 2, 2017 for PCT Application No. PCT/EP2017/058345.

* cited by examiner

IMPROVING SLUDGE DEWATERABILITY AND ENERGY BALANCE OF WASTEWATER TREATMENT

FIELD OF THE INVENTION

The present invention relates to treatment of primary sludge from a wastewater treatment.

BACKGROUND ART

Treating wastewater has the aim to produce an effluent that will do as little harm as possible when discharged to the surrounding environment or returning to water streams, thereby preventing pollution compared to releasing untreated wastewater into the environment. Many parameters relating to wastewater treatment are also regulated by authorities and the aim is to fulfil the requirements.

Municipal wastewater or sewage treatment generally involves three stages, called primary, secondary and tertiary treatment.

Municipal wastewater contains a lot of different substances which are not desirable in water. Influent of a municipal wastewater treatment may be black and gray waters.

A pre-treatment removes all materials that can be easily collected from the raw sewage or wastewater before they damage or clog any pumps and sewage lines of primary treatment apparatuses. Objects commonly removed during pretreatment include trash, tree limbs, leaves, branches, and other large objects.

The primary treatment is designed to remove gross, suspended and floating solids from raw sewage. It includes screening to trap solid objects and sedimentation by gravity to remove suspended solids. This level is sometimes referred to as "mechanical treatment", although chemicals are often used to accelerate the sedimentation process. Primary treatment can reduce the biochemical oxygen demand (BOD) of the incoming wastewater by 20-30% and the total suspended solids (TSS) by some 50-60%. Primary treatment is usually the first stage of wastewater treatment. The sludge, primary sludge, obtained at the primary treatment may be subjected to further treatment and reuse. The sludge may be composted, put on landfill, dewatered or dried to reduce the water content, and/or digested for methane production.

After the primary treatment, the wastewater is directed to a secondary treatment, which includes a biological treatment and removes the dissolved organic matter, phosphorus and nitrogen that escapes the primary treatment. This is achieved by microbes consuming the organic matter, and converting it to carbon dioxide, water, and energy for their own growth and reproduction.

Alternatively, wastewater may be subjected to enhanced biological phosphorus removal (EBPR) after the primary treatment.

Secondary treatment may require a separation process ("secondary sedimentation") to remove the micro-organisms and more of the suspended solids from the treated water prior to discharge or the tertiary treatment. More than 85% of the suspended solids and BOD can be removed by a well running plant with secondary treatment.

Tertiary treatment is sometimes defined as anything more than primary and secondary treatment in order to allow rejection into a highly sensitive or fragile ecosystem (estuaries, low-flow rivers, coral reefs, etc). Treated water is sometimes disinfected chemically or physically (e.g. by lagoons and microfiltration) prior to discharge into recipient or reuse. An example of a typical tertiary treatment process is the modification of a conventional secondary treatment plant to remove additional phosphorus and/or nitrogen.

The sludge obtained at the primary treatment is preferably put to good use. The sludge may be further decomposed to provide biogas, and the digestate obtained may be dewatered to minimize the water content of the final solids cake obtained. For sludge downstream processing such as transport, composting, incineration, and disposal as high dry solids content as possible is desirable.

There is still a need for improved procedures that efficiently treat the primary sludge.

SUMMARY OF THE INVENTION

An object of the present invention is to provide a process for treating primary sludge of a wastewater. A further object of the present invention is to provide a method for improving primary sludge dewaterability. Still another object of the present invention is to provide a method for improving energy balance of a wastewater treatment plant.

The present process provides an improved sludge with better and easier dewatering and thus higher dry solids for downstream processing. In addition the process reduces the need for further treatment of the primary effluent.

SHORT DESCRIPTION OF THE DRAWINGS

DETAILED DESCRIPTION

Figure 1:
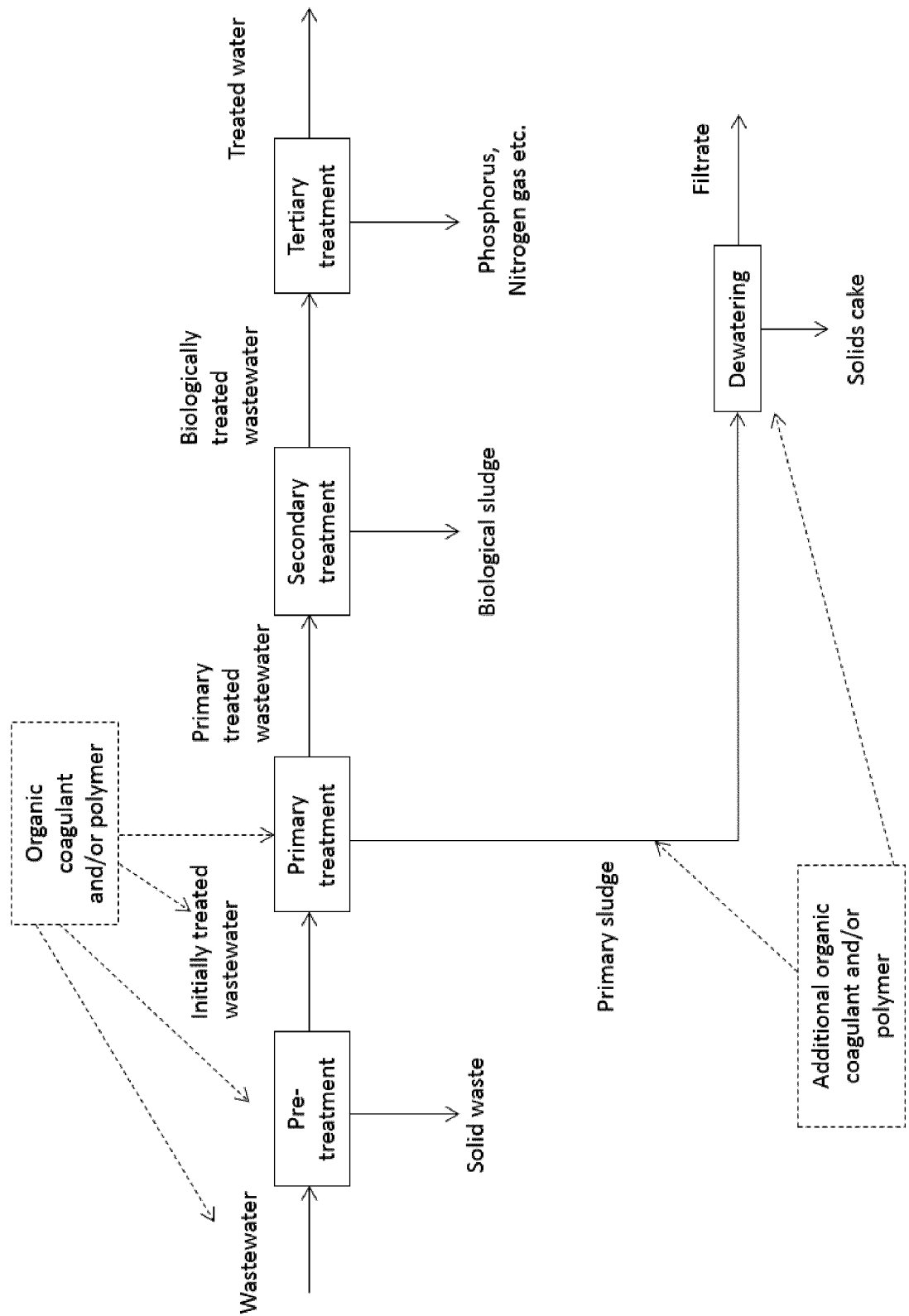
FIG. 1 shows a schematic view of the wastewater treatment process indicating the primary sludge treatment.
Figure 2:
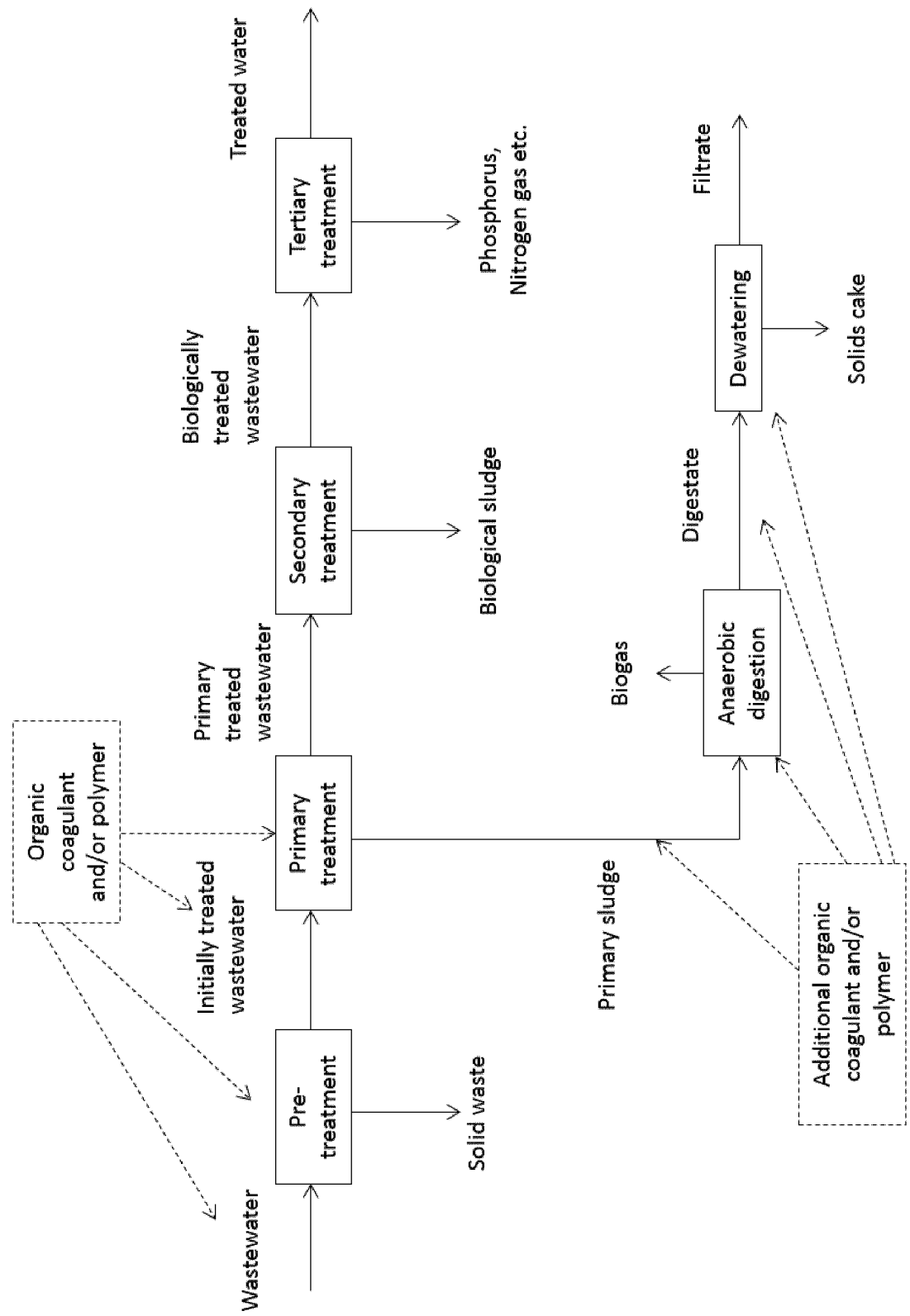
FIG. 2 shows a schematic view of the wastewater treatment process indicating the primary sludge treatment including an anaerobic step.

The present process has provided a way to achieve better dewaterability of primary sludge. Main focus areas in primary treatment were organics and suspended solids removal. By providing an organic coagulant or polymer in the primary treatment low suspended solids and organic content will be obtained in the primary effluent. In an embodiment, digested primary sludge, digestate, is produced in an anaerobic digester. By degrading the primary sludge into digestate, a high methane as well as biogas yield is achieved.

One object according to the present invention is to provide a process for treating primary sludge in a wastewater treatment plant, comprising the steps of:

admixing an organic coagulant and/or polymer to wastewater;

allowing a primary treatment of the wastewater in the presence of the organic coagulant or polymer;

separating solids as a primary sludge from said primary treatment; and dewatering the primary sludge.

The primary sludge may be anaerobically digested to provide a digested primary sludge and biogas. The primary sludge may be digested before being dewatered.

The primary treatment of wastewater treatment is a mechanical treatment step. This primary treatment may also be disclosed as a primary sedimentation stage. In that treatment wastewater or sewage flows through large tanks, which are used to settle sludge.

The organic coagulant and/or polymer may be admixed to the wastewater before and/or during the primary treatment. As an example, the organic coagulant or polymer may be added before and/or during and/or after a pretreatment of the wastewater preceding said primary treatment. In one embodiment the organic coagulant or polymer is admixed during the primary treatment or added to the influent into the primary treatment, optionally subsequent any pretreatment step.

As mentioned the primary treatment may be preceded by a pretreatment. Such a pretreatment is done to remove all large objects and materials that are not desirable e.g. sand, grease, oil, etc., to have in the primary treatment.

The amount of organic coagulant or polymer that may be admixed to the wastewater may be in an amount of about 0.5-15 ppm, e.g. 1-10 ppm, 2-7 ppm, or 2-5 ppm.

After the primary treatment the organic coagulant or polymer may be present in the total solids of the primary sludge in an amount of about 0.2-25 wt %, e.g. 0.4-17 wt %, 0.8-12 wt %, 0.8-8.3 wt %, or 0.8-4.2 wt %.

It is to be noted that additional organic coagulant or polymer may be added to the primary sludge and/or digested primary sludge. Addition is preferably made before and/or during the subsequent dewatering step. Addition may e.g. be made to the primary sludge before an anaerobic digestion, and/or added to the anaerobic digestion step, and/or added to the digestate before and/or during the subsequent dewatering step. Such an additional organic coagulant or polymer may be the same or different to the organic coagulant or polymer used in the primary water treatment step.

The organic coagulant or polymer and/or additional organic polymer may be selected from polyacrylamide, polyamine, polyDADMAC, melamine formaldehydes, natural polymers, such as tannins and lignin, natural polysaccharides, such as starch, cellulose, hemicellulose alginate, guar gum, pectin, chitin and chitosan, and cationic or anionic derivatives thereof, and any combination thereof. For example, the compounds may be selected from polyacrylamide, polyamine and polyDADMAC, and any combination thereof.

The present process may be improved further by admixing an inorganic coagulant to and/or before the dewatering step of the primary sludge. An inorganic coagulant may be added to the primary sludge before an anaerobic digestion, and/or added to the anaerobic digestion step, and/or added to the digested primary sludge before and/or during the subsequent dewatering step.

If an inorganic coagulant is used it may be selected from iron, aluminium and magnesium salts, and any combination thereof. In some embodiments, inorganic coagulant may be selected from salts of zinc, zirconium, titanium, silicon, or the like. The inorganic coagulant may be salts of the above metals, and may be chosen from chlorides, sulphates, hydroxides, oxides, and nitrates, and any combination thereof. Examples of such compounds are aluminium sulphate, aluminium chloride, polyaluminium chloride, polyaluminium sulphate, polyaluminium nitrate, aluminium chlorohydrate, ferric chloride, ferric sulphate, ferric chlorosulphate, ferrous chloride, ferrous sulphate, ferrous chlorosulphate, ferric hydroxide, ferrous hydroxide, magnesium oxide, magnesium hydroxide, and magnesium chloride, and may also be used in any combination thereof.

The solids formed and present in the primary treatment step may be separated as a primary sludge by any one of sedimentation, flotation, filtration, and centrifugation, and any combination thereof. In one embodiment a hydrocyclone may be used for the separation.

The primary sludge or the digestate of the anaerobic step may be separated into liquid and solids using a dewatering step. The dewatering of the digestate may be done by a separation selected from sedimentation, flotation, pressing, centrifugation and filtration, and any combination thereof. The separation methods may be performed using any one of a decanter centrifuge, screw press, disk filter press, filter press, chamber filter press, and belt filter press, and any combination thereof.

Preferably the suspended solids removal is improved by 1-10%, e.g. by 4-6%, compared to a pure mechanical primary wastewater treatment that normally is used without any addition of chemicals and compared to a primary wastewater treatment having addition of inorganic coagulant.

Preferably the suspended solids contents in the reject water is reduced by about 30-80%, e.g. by about 40-50%, compared to a pure mechanical primary wastewater treatment that normally is used without any addition of chemicals, or e.g. by about 60-70% compared to a primary wastewater treatment having addition of inorganic coagulant.

By adding an organic coagulant or polymer at an early stage of a wastewater treatment, so that the organic coagulant or polymer is present during the primary treatment step the removal of organics is increased. The amount of removed organics may be doubled by the usage of an organic coagulant or polymer in the primary wastewater treatment step. Preferably the amount of removed organics from the wastewater is increased with at least 25 wt %, e.g. 50 wt %, 75 wt % or 100 wt %, compared to a pure mechanical primary wastewater treatment that normally is used without any addition of chemicals. Also the amount of methane formed in the digester is increased compared to ordinary primary sludge just having been mechanically treated, but also increases or at least remains the same compared to primary sludge having presence of inorganic coagulant. Preferably the amount of methane obtained from the anaerobic digester is increased with at least 25 wt %, e.g. 50 wt %, 60 wt % or 70 wt %, compared to a pure mechanical primary wastewater treatment that normally is used without any addition of chemicals.

Preferably the amount of methane obtained from the anaerobic digester is increased with at least 2 wt %, e.g. 4 wt %, 6 wt % or 10 wt %, compared to a primary wastewater treatment having addition of inorganic coagulant.

The present invention provides a method of improving primary sludge dewaterability in a wastewater treatment plant, wherein the primary sludge is treated according to the present process.

Additionally, there is provided a method of improving the energy balance of a wastewater treatment plant, wherein the biogas obtained in the anaerobic digestion step according to the present process is converted to electricity and/or the dewatered primary sludge cake obtained in the present process is burned to produce energy. The biogas obtained may be used within the wastewater treatment plant as it is or when converted into electricity, or it be sold in any of the forms. In a similar manner the dewatered primary sludge cake may be incinerated to provide energy in the form of heat and/or electricity, which may be used within the plant or may be sold.

The following non-limiting examples are intended to merely illustrate the advantages obtained with the embodiments of the present invention.

EXAMPLES

Substrates and Inoculum

The primary sludge substrates used in an anaerobic digestion were three differently settled wastewater sludges from a municipal wastewater treatment plant. Sludge was collected weekly.

The first sludge was settled without any chemical addition in 400 L container (referred as Ref).

The second sludge was collected after adding 36 mL ferric chloride (Kemira PIX-111) and settling in 200 L container, providing a reference sludge with an inorganic coagulant treatment (referred as Fe).

The third sludge was collected after a 1500 mL addition of polymer (Kemira Superfloc C-492) (0.1% w/w) and with total settling volume of 300 L (200 L and 100 L containers) (referred as Pol).

The containers were filled with wastewater in four parallel steps to ensure the homogeneity of the settling batches. After filling and mixing the wastewater, a mixed sample (at 0 min) was collected. All sludges were settled for 1 h 45 min. Subsequently, supernatant water was drained from the containers. In Pol and Fe containers, supernatant was drained through a filter cloth, resulting in about 1-2 L of collected sludge. Unlike Pol sludge, Fe sludge was clogging the filter and it was further dewatered by pressing. In Ref sludge, the settled fraction (about 40 L) was brought to laboratory and drained through a metal sieve.

Inoculum for the anaerobic digestion of the primary sludge samples was collected from a mesophilic anaerobic digester, digesting mixture of primary and secondary sludge from a municipal wastewater treatment plant.

Reactor Trials

Three continuous stirred-tank reactors (CSTR), each of size 2 L and liquid volume of 1.5 L were used. The CSTRs were constructed of glass and fitted with outlets at the top of the reactor for biogas collection, feeding, and digestate withdrawal. Biogas was collected into aluminium foil bags. Reactors were stirred continuously with magnetic stirrers at 300 rpm.

Reactors were inoculated with 1.5 L of inoculum and feeding was started at day 1. CSTRs were fed every weekday (from Monday to Friday) for 70 days. One reactor was fed with reference sludge without chemicals (Ref), one reactor with reference ferric sludge (Fe) and one reactor with polymer (Pol) sludge. All reactors were operated at 35° C. Reactors were fed days 1-13 with hydraulic retention time (HRT) of 40 d and days 14-70 with constant HRT of 20 d. Corresponsive organic loading rate (OLR) varied between 1.9 and 2.9 kg VS m-3 d-1.

During days 0-17 all sludges were adjusted to the same total solids (TS) content (about 5-8%), while volatile solids (VS) varied between feeds due to different VS contents of sludges, causing slight differences in OLRs. During days 18-70 sludges were adjusted to the same VS, meaning that OLRs were equal in all reactors, but the fed TS varied. During days 1-34 the concentration of feeds was adjusted to achieve design OLR of 2.8 kg VS m-3 d-1, but during days 35-70 design OLR was lowered to 2.2 kg VS m-3 d-1 by diluting feeds (TS 4.3-5.8%).

Analysis and Calculations

The methane content of the biogas produced in the reactor trials was measured with a Shimadzu GC-2014 TCD gas chromatograph. The volume of biogas was measured using water displacement. All results are given as normal temperature and pressure (NTP) as the temperature and atmospheric pressure in the lab were monitored on a daily basis. TS and VS were analysed according to standard methods APHA 2540.

Total organic carbon (TOC) was analyzed in accordance with SFS-EN 1484 using Shimadzu TOC-V analyzer. For solid samples, solid sample combustion unit was used.

Only results after day 44 (last 26 days) have been taken into account herein. At that point the experiments had been running for about two HRTs and therefore results are representative. This period after day 44 was intensive monitoring period and most of the analyses were done on a daily basis.

Results

Results of Primary Settling and Anaerobic Digestion Experiments

In tables 1-4 are presented mass flows in every step from primary settling to dewatering after anaerobic digestion. In the tables all the values are calculated as grams per cubic meter of treated waste water.

TABLE 1

Incoming to primary settling

|  | Influent wastewater | Chemicals | | |
|---|---|---|---|---|
|  |  | Ref | Fe | Pol |
| TS (g/m$^3$) | 620 | 0 | 136 | 5.0 |
| VS (g/m$^3$) | 349 | 0 | 34 | 4.9 |
| C (g/m$^3$) | 113 | — | — | — |

TABLE 2

Outcoming from primary settling

|  | Primary Effluent | | | Primary Sludge | | |
|---|---|---|---|---|---|---|
|  | Ref | Fe | Pol | Ref | Fe | Pol |
| TS (g/m$^3$) | 478 | 452 | 377 | 146 | 292 | 248 |
| VS (g/m$^3$) | 231 | 194 | 131 | 134 | 228 | 220 |
| C (g/m$^3$) | 76 | 47 | 39 | 47 | 79 | 96 |

TABLE 3

Outcoming from digester after being feed primary sludge

| Biogas | | | |
|---|---|---|---|
|  | Ref | Fe | Pol |
| CH4 (g/m$^3$) | 29 | 54 | 58 |
| CO2 (g/m$^3$) | 65 | 96 | 105 |
| C (g/m$^3$) | 39 | 67 | 72 |

| Digestate | | | |
|---|---|---|---|
|  | Ref | Fe | Pol |
| TS (g/m$^3$) | 62 | 154 | 116 |
| VS (g/m$^3$) | 48 | 92 | 84 |
| C (g/m$^3$) | 33 | 64 | 58 |

Results for Biogas Production

Figure 3:
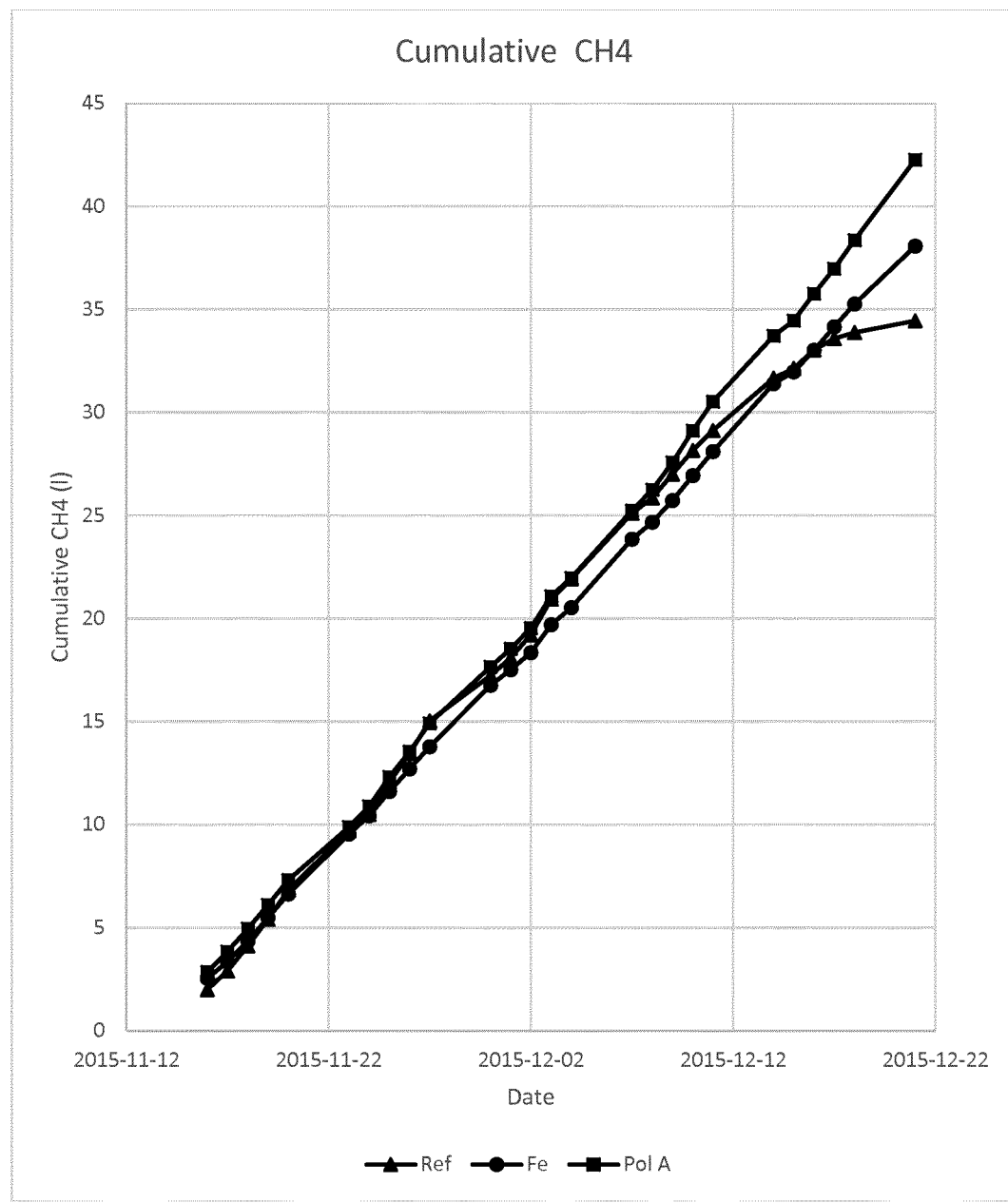
FIG. 3 shows a graph of the cumulative methane amount from an anaerobic digester using differently treated sludges.

In FIG. 3 is presented cumulative methane production during intensive monitoring period in all the reactors. As can be seen at the end of the monitoring period the result from the reactor with polymer (Pol) and the reference reactor with inorganic coagulant (Fe) provide a better methane yield than the reference reactor without chemicals (Ref).

As can be seen in Table 3 the reactor with polymer (Pol) is producing most methane per cubic meter of treated waste water. It is producing 58 g $CH_4/m^3$ treated waste water. The reference reactor with inorganic coagulant reactor (Fe) had second highest methane production: 54 g $CH_4/m^3$ treated waste water. Reference reactor without chemicals (Ref) had clearly the lowest methane production, only 29 g $CH_4/m^3$ treated waste water. The clearly lower methane production is mainly explained by lower VS and carbon recovery to primary sludge.

All the reactors were operating close to their maximum feeding rates. In FIG. 3 is presented cumulative methane production during intensive monitoring period in all the reactors. In said figure it can also be seen that Fe reactor is having consistently lower methane production that Pol reactor.

During the intensive monitoring period Pol reactor had 7% higher methane production than Fe reactor. This is quite significant difference and is affecting the total economy of waste water treatment process. Pol reactor had also 101% higher methane production than Ref reactor.

Digestate Dewatering

Figure 4:
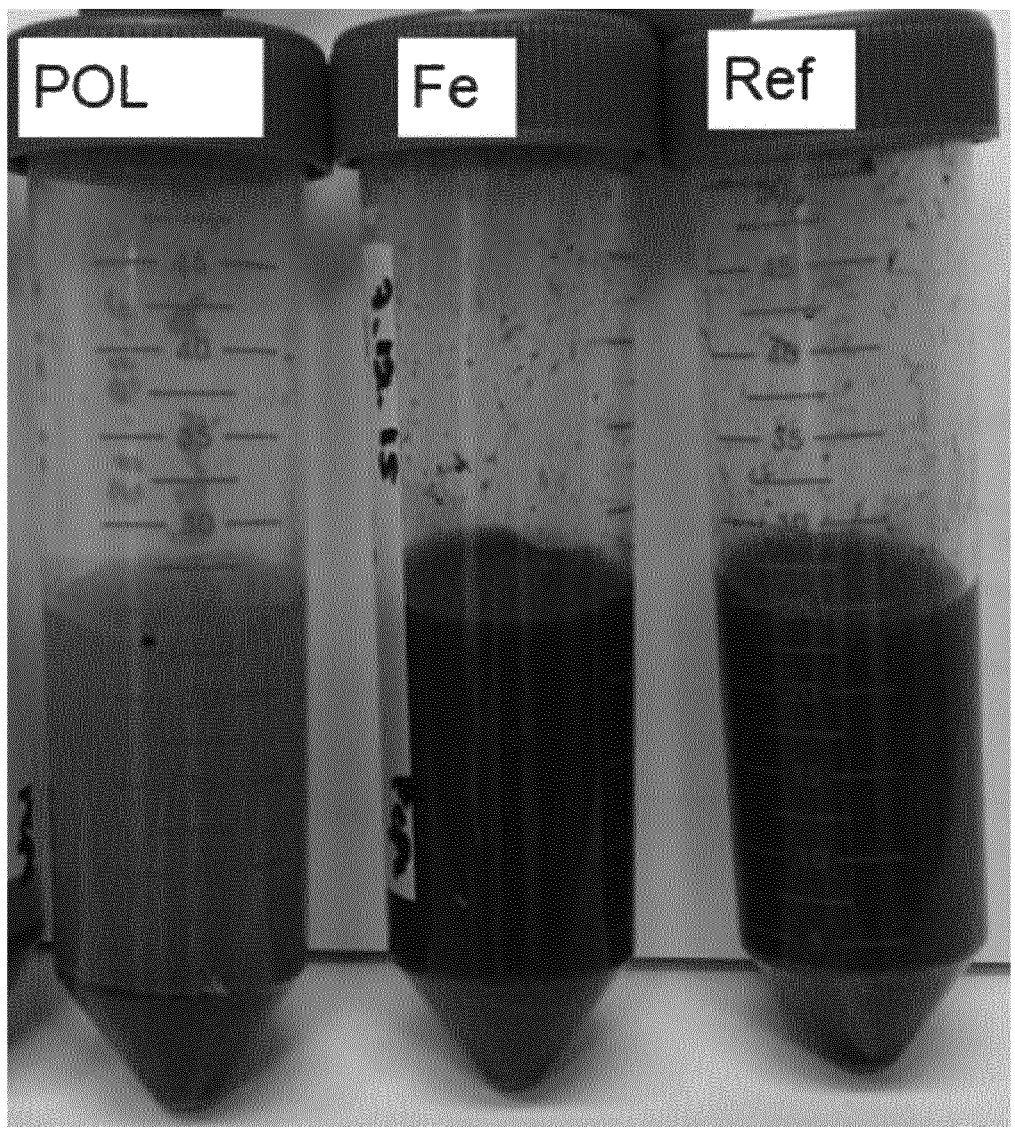
FIG. 4 shows a picture of differently treated sludges after digestion and centrifugation.

In FIG. 4 and Table 4 is presented digestate samples after centrifuging 5 minutes with 3000 rpm. In the figure can be seen a clear difference in solid liquid separation. The digestate with polymer (Pol) seem to have better dewaterability. That sample have a considerably lighter colour compared to the digastates comprising inorganic coagulant and reference digestate. The digestate with polymer has the main part of the solids found at the bottom of the test tube, indication a good solid liquid separation. The other samples, reference and inorganic coagulant, have still disperesed solid phase all through the test tube. It seems that polymer has at least some functionality left after digestion. Having a good solid liquid separation of the digestate improves the properties during a subsequent dewatering step.

TABLE 4

Digested primary sludge centrifugation results.

| Sample | SS beginning (g/l) | SS reject water (g/l) | SS Removal (g/l) | SS Removal (%) | TS beginning (%) | TS reject water (%) | Sample Turbidity |
|---|---|---|---|---|---|---|---|
| Ref | 16.6 | 1.54 | 15.06 | 90.7 | 2.12 | 0.47 | 3634 |
| Fe | 25.3 | 2.24 | 23.06 | 91.1 | 3.11 | 0.58 | 3905 |
| Pol | 20.4 | 0.86 | 19.54 | 95.8 | 2.41 | 0.39 | 1040 |

CONCLUSIONS

In these experiments one embodiment of the present invention was compared to two reference methods. The comparison was made in several steps of the wastewater treatment process. In the experiments it was noticed that with the embodiment of the present invention biogas production was increased and primary effluent VS load was reduced compared to the two reference methods. Thus, the energy balance of the wastewater treatment plant was improved.

Surprisingly, solid-liquid separation of the digested sludge was also improved with the embodiment of the present invention compared to the two reference methods. This was noticed in higher SS removal during centrifugation and also lower turbidity of the filtrate water after centrifugation. Both of these factors are important for efficient operation of wastewater treatment plants.

As can be seen from the present examples the use of organic coagulant and/or polymer according to the present process significantly improves the performance of the wastewater treatment plant.

During the tests it was surprisingly found that more biogas was generated with polymer than with coagulant iron. At the same time, it was unexpectedly found that the treatment load going to aeration could be reduced. In general, inorganic coagulants (e.g. Fe) are considered as most effective in substance removal. However, the present invention has provided an improved performance using polymer. Also, it was surprisingly found that at least some functionality of the polymer is still left after 20 days' digestion.

The invention claimed is:

1. A process for treating primary sludge in a wastewater treatment plant, comprising the steps of:
    admixing an organic coagulant and/or polymer to wastewater, wherein the organic coagulant and/or polymer is admixed to the wastewater before and/or during the primary treatment, and wherein the organic coagulant or polymer is selected from polyacrylamide, polyamine, polyDADMAC, melamine formaldehydes, natural polymers, starch, cellulose, hemicellulose alginate, guar gum, pectin, chitin and cationic or anionic derivatives thereof;
    allowing a primary treatment of the wastewater in the presence of the organic coagulant or polymer;
    separating solids as a primary sludge from said primary treatment;
    anaerobically digesting said primary sludge to provide a digested primary sludge and biogas; and
    dewatering the digested primary sludge to provide a dewatered primary sludge cake, wherein an additional organic coagulant and/or polymer is added before and/or during the dewatering, and wherein the additional organic coagulant and/or polymer is selected from polyacrylamide, polyamine, polyDADMAC, melamine formaldehydes, natural polymers, natural polysaccharides, starch, cellulose, hemicellulose alginate, guar gum, pectin, chitin, chitosan, or cationic or anionic derivatives thereof.

2. The process according to claim 1, wherein the organic coagulant and/or polymer is admixed to the wastewater in at least one position selected from:
    during a pretreatment of the wastewater preceding said primary treatment,
    after a pretreatment of the wastewater preceding said primary treatment, or
    during the primary treatment.

3. The process according to claim 1, wherein the organic coagulant or polymer is present in the total solids of the primary sludge in an amount of about 0.2-25 wt %.

4. The process according to claim 3, wherein the organic coagulant or polymer is present in the total solids of the primary sludge in an amount of 0.4-17 wt %.

5. The process according to claim 3, wherein the organic coagulant or polymer is present in the total solids of the primary sludge in an amount of 0.8-12 wt %.

6. The process according to claim 3, wherein the organic coagulant or polymer is present in the total solids of the primary sludge in an amount of 0.8-8.3 wt %.

7. The process according to claim 3, wherein the organic coagulant or polymer is present in the total solids of the primary sludge in an amount of 0.8-4.2 wt %.

8. The process according to claim 1, wherein the organic coagulant or polymer and/or the additional organic polymer is selected from polyacrylamide, polyamine, polyDADMAC, or any combination thereof.

9. The process according to claim 1, further comprising admixing an inorganic coagulant to and/or before the dewatering step.

10. The process according to claim 9, wherein the inorganic coagulant is selected from iron, magnesium and aluminium salts, or any combination thereof.

11. The process according to claim 10, wherein the inorganic coagulant is selected from aluminium sulphate, aluminium chloride, polyaluminium chloride, polyaluminium sulphate, polyaluminium nitrate, aluminium chlorohydrate, ferric chloride, ferric sulphate, ferric chlorosulphate, ferrous chloride, ferrous sulphate, ferrous chlorosulphate, ferric hydroxide, ferrous hydroxide, magnesium oxide, magnesium hydroxide, and magnesium chloride, or any combination thereof.

12. The process according to claim 1, further comprising admixing an inorganic coagulant before and/or to and/or after the anaerobic digesting step.

13. The process according to claim claim 1, wherein the separation of solids as the primary sludge from said primary treatment is done by any one of sedimentation, flotation and filtration, centrifugation, hydrocyclone or any combination thereof.

14. The process according to claim 1, wherein the dewatering of the primary sludge is done by a separation selected from sedimentation, flotation, pressing, centrifugation and filtration, or any combination thereof.

15. The process according to claim 14, wherein the dewatering of the primary sludge is done by using any one of a decanter centrifuge, screw press, disk filter press, filter press and belt filter press, or any combination thereof.

16. A method of improving primary sludge dewaterability in a wastewater treatment plant, wherein the primary sludge is treated according to the process claim 1.

17. A method of improving energy balance of a wastewater treatment plant, by converting the biogas obtained in the anaerobic digestion according to claim 1 to electricity.

18. A method of improving energy balance of a wastewater treatment plant, by incinerating the dewatered primary sludge cake of claim 1 produce energy.

* * * * *